April 25, 1967  B. R. WANLASS  3,316,034
SLIP-IN BEARING
Filed July 14, 1964

INVENTOR.
Bert Ray Wanlass
BY
Robert L. Spencer
ATTORNEY 3,316,034
SLIP-IN BEARING
Bert Ray Wanlass, Warren, Mich., assignor to General Motors Corporation, Detroit, Mich., a corporation of Delaware
Filed July 14, 1964, Ser. No. 382,460
5 Claims. (Cl. 308—26)

This invention relates to bearings and more particularly to bearings which may be preassembled to a gear for insertion in a gear mechanism.

In many present day applications, a flexible cable is used to drive a worm which in turn drives a worm gear nut for translating rotating movement to linear movement in an object such as a jack screw. The method of assembling the worm in proper relation to the worm gear nut requires extensive machining and is often difficult to assemble.

An object of this invention is to provide a worm and bearing subassembly which may be easily inserted into bearing seats for properly aligning the worm with the mating worm gear.

A further object of this invention to provide slip-in bearings which are preformed to properly fit within their bearing seats and which are further designed with means to accommodate production variations of the assembled components.

Another object of this invention is to provide a worm and slip-in bearing sub-assembly which is less expensive to manufacture and easier to assemble.

A further object of this invention is to provide a sub-assembly which may be easily replaced when worn or damaged.

These and other objects of this invention may be readily ascertainable by reference to the accompanying drawings and specification wherein.

Figure 1:
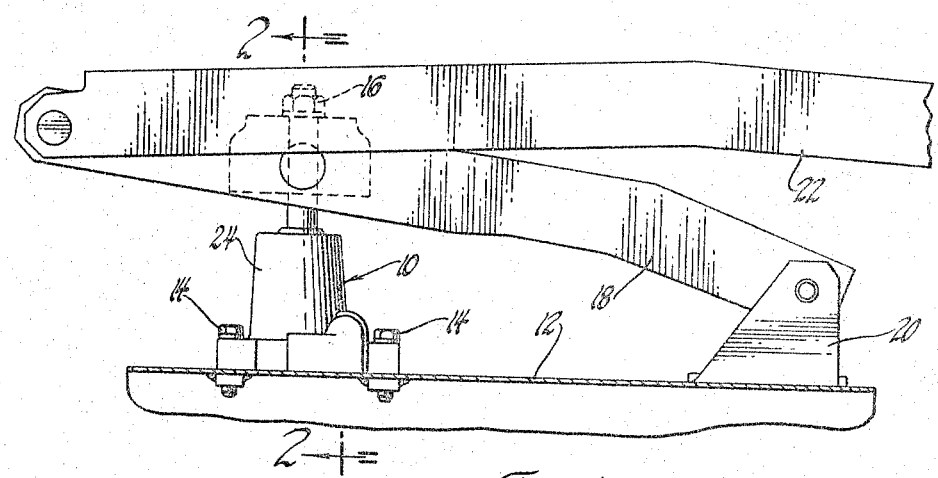
FIGURE 1 is a view of a jack screw, utilizing the present invention, for actuating the linkage of a seat adjuster.

Referring now to the drawings, as best seen in FIGURE 1, a jack screw 10 is secured to a vehicle floor 12 by bolts 14. The upper end of shaft 16 of the jack screw 10 is secured to a link 18 which is pivotally secured at one end to a bracket 20 secured to the vehicle floor 12 and pivotally secured at the other end to the seat support member 22.

Figure 2:
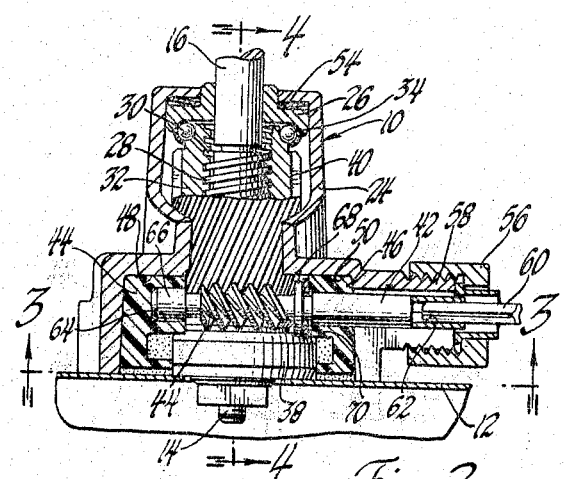
FIGURE 2 is a view taken substantially along the line 2—2 of FIGURE 1, with sections broken away, showing the position of the worm and bearing sub-assembly in the jack screw.
Figure 3:
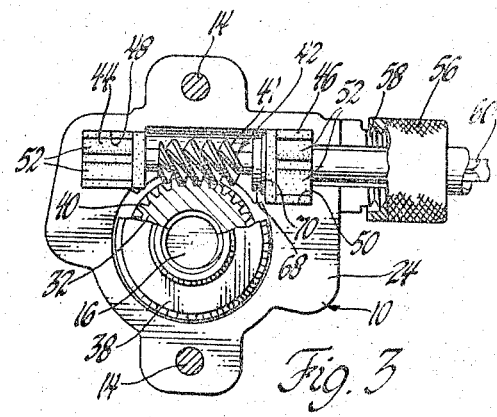
FIGURE 3 is a view taken substantially along the line 3—3 of FIGURE 2, with sections broken away, showing the worm engaging the worm gear.
Figure 4:
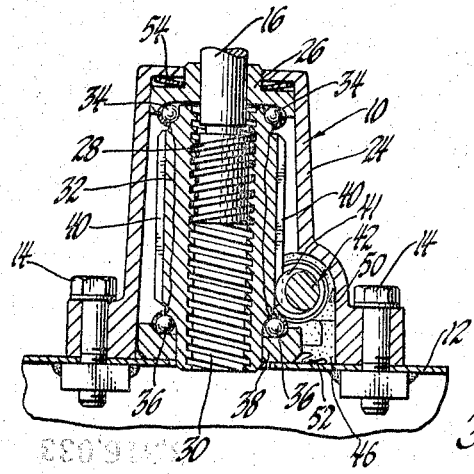
FIGURE 4 is a view taken substantially along the line 4—4 of FIGURE 2, with sections broken away, illustrating the assembled relationship of the components of the jack screw and the worm sub-assembly.

Referring now to FIGURES 2 through 4, the jack screw 10 consists of a housing 24 having the shaft 16 journaled in an upper guide race 26. The lower end of shaft 16 is formed with a thread portion 28 which is threadably engaged with the threads 30 of a gear nut 32. The gear nut 32 is rotatably supported in the housing 24 by an upper set of ball bearings 34 and a lower set of ball bearings 36. The upper set of ball bearings 34 is positioned between the gear nut 32 and the upper guide race 26 while the lower set of ball bearings 36 is positioned between the gear nut 32 and a lower race 38. The outer surface of the gear nut 32 is formed with a plurality of teeth 40 which are meshingly engaged with threads or teeth 41 of the worm 42.

The worm 42 is journaled in a set of bearings 44, 46. The bearings 44, 46, preferably made of nylon, are adapted to slip into the bearing pockets 48, 50 of the housing 24. The walls of the pockets 48, 50 have a slight taper, as best seen in FIGURE 4, for ease of assembling and removing the bearings 44 and 46. The bearings 44 and 46 are formed with a pair of flexible feet 52 for maintaining the bearings 44 and 46 in firm engagement in the bearing pockets 48 and 50, respectively, when the jack screw is mounted in operating position. A Belleville washer 54 is positioned between the upper race guide 26 and the housing 10 to maintain a snug fit of the parts in the jack screw and to allow slippage of the upper race 26 when the shaft 16 has reached the upper end of travel.

As best seen in FIGURES 2 and 3, a nut 56 engages a thread portion 58 of the housing 10 for securing a flexible drive cable 60 in keyed engagement with the square aperture 62 of the worm 42.

The bearing 44 has a blind aperture 64 in which the end 66 of the worm 42 is journaled. The blind aperture 64 limits end travel of the worm 42 in one direction. A shoulder 68 is formed on the worm 42 adjacent bearing 46 to limit end travel of the worm 42 in the other direction. A washer 70 is positioned between the shoulder 68 and the bearing 46 to reduce wear on the bearing 46 by the shoulder 68.

In assembling the jack screw, the housing 24 is placed with the small end down or inverted relative to the position shown in FIGURE 1. In this inverted position the parts of the jack screw may be easily assembled by successively dropping first the Belleville washer 54, then the upper guide race 26, upper bearings 34, gear nut 32 and lower bearings 36 into the housing 24. The shaft 16 may be threaded into the gear nut 32 prior to insertion of the gear nut into the housing or at the assembler's discretion after the gear nut has been assembled.

Figure 5:
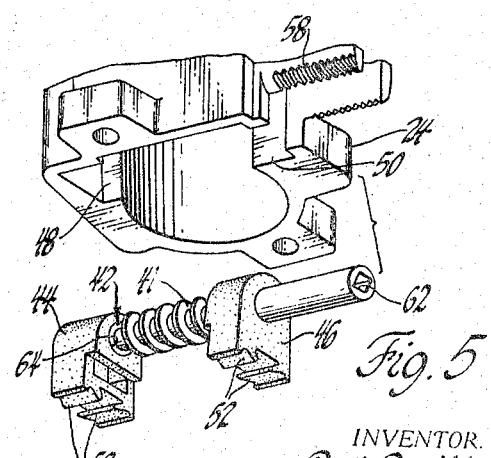
FIGURE 5 is an exploded view of the jack screw case and the worm sub-assembly.

The worm and bearing sub-assembly is preassembled by inserting the end 66 of worm 42 in the aperture 64 of bearing 44. The washer 70 is positioned about the worm 42 adjacent shoulder 68 and then the bearing 46 is slid over the other end of worm 42. The sub-assembly thus formed, as best seen in FIGURE 5, is then slipped into the bearing pockets 48 and 50, meshing the worm 42 into engagement with the teeth 40 of the gear nut 32. The lower race is then positioned about the gear nut 32 and the assembly is bolted to a supporting member such as floor 12. As the assembly is bolted to the supporting floor 12, the flexible feet 52 of bearings 44 and 46 are flexed from normal position, thus producing a thrust which urges the bearings 44 and 46 to fit firmly in the bearing pockets 48 and 50.

The slip-in bearings of this invention permit the housing 24 to be formed in one casting operation, such as die casting, and eliminates expensive machining operations to the casting, as was previously required in this assembly. In previous designs of this jack screw additional machining operations were required for the worm 42 to be journaled in the housing. These machining operations include accurately drilling an aperture in the housing to accommodate and act as a bearing for the end 64 of the worm and drilling an aligned opening on the opposite side of the housing to accommodate the insertion of the worm 42. A bushing for the other end of the worm was required since the teeth required a larger opening than the shaft. Then a hole had to be drilled and tapped for a set screw to secure the bushing in place. Thus, it can be seen that with the simple slip-in bearings preassembled with the worm and slipped into the bearing seats in the housing, a simpler and more easily assembled jack screw has been developed.

While but one embodiment of the subject slip-in bearing has been described, it is to be understood that obviously many other applications may be found for this type of assembly without departing from the spirit and scope of the following claims.

I claim:
1. In combination, a housing adapted to be mounted on a support, a pocket formed in said housing slidably receiving a bearing therein, spaced support surfaces in said pocket contacting said bearing, said bearing being assembled in said pocket, spaced support surfaces on said bearing contacting said housing pocket support surfaces and cooperating therewith to permit slidable motion of said bearing relative to said housing and to prevent all other motion of said bearing relative to said housing, biasing means for opposing slidable motion of said bearing relative to said pocket when said housing is mounted on said support, and means rotatable with respect to said housing supported for rotation by said bearing.

2. In combination, a housing adapted to be mounted on a support, a pocket formed in said housing slidably receiving a bearing therein, spaced planar support surfaces in said pocket for contacting said bearing when said bearing is assembled in said pocket, spaced planar support surfaces on said bearing contacting said housing pocket support surfaces and cooperating therewith to permit slidable motion of said bearing relative to said housing and to prevent all other motion of said bearing relative to said housing, biasing means for opposing slidable motion of said bearing relative to said pocket when said housing is mounted on said support, and means rotatable with respect to said housing supported for rotation by said bearing.

3. In combination, a housing adapted to be mounted on a support and having a pair of spaced bearing pockets, a pair of bearings and a rotatable shaft, each of said bearings rotatably supporting said shaft to form a subassembly slipped into said pockets along an axis substantially normal to the longitudinal axis of said shaft, and resilient means engaging the support and urging the bearings into the associated pockets when said housing is mounted on said support.

4. In combination, a housing adapted to be mounted on a support and having a pair of aligned bearing pockets, a pair of bearings and a rotatable shaft, each of said bearings having an aperture therein rotatably supporting one end of said shaft to form a subassembly, the bearings of said subassembly being slipped into said pockets along an axis substantially normal to the longitudinal axis of said shaft, and resilient means formed with said bearings engaging the support for biasing the bearings into the associated pockets when said housing is mounted on said support.

5. In combination, a housing having an open end adapted to be mounted on a support and having a pair of aligned tapered bearing pockets formed therein, a pair of bearings, a rotatable shaft, each of said bearings having an aperture therein for rotatably supporting one end of said shaft to form a subassembly, the bearings of said subassembly being slipped into said pockets along an axis substantially normal to the longitudinal axis of said shaft, and flexible feet portions formed with said bearings engaging the support for biasing the bearings into the associated pockets when said housing is mounted on said support.

References Cited by the Examiner
UNITED STATES PATENTS

| | | | |
|---|---|---|---|
| 2,651,212 | 9/1953 | Mackmann | 74—425 |
| 3,220,277 | 11/1965 | Dixon | 74—424.8 |
| 3,243,237 | 3/1966 | Sprecher | 308—3.8 |

DAVID J. WILLIAMOWSKY, *Primary Examiner.*

L. H. GERIN, *Assistant Examiner.*